United States Patent
Siegel

[11] Patent Number: 6,113,365
[45] Date of Patent: Sep. 5, 2000

[54] PISTON PUMP

[75] Inventor: Heinz Siegel, Stuttgart, Germany

[73] Assignee: Robert Bosch GmbH, Stuttgart, Germany

[21] Appl. No.: 09/168,959

[22] Filed: Oct. 9, 1998

[30] Foreign Application Priority Data

Oct. 30, 1997 [DE] Germany ............... 197 47 851

[51] Int. Cl.[7] ............... F04B 23/00
[52] U.S. Cl. ............... 417/440; 417/434; 417/554; 60/453; 92/79
[58] Field of Search ............... 417/440, 434, 417/273, 272, 470, 554; 137/539.5; 60/453; 92/79

[56] References Cited

U.S. PATENT DOCUMENTS

| | | | |
|---|---|---|---|
| 5,178,184 | 1/1993 | Skillman ............... | 417/554 |
| 5,213,482 | 5/1993 | Reinartz et al. . | |
| 5,232,273 | 8/1993 | Eckstein et al. . | |
| 5,353,834 | 10/1994 | Schmitt et al. . | |
| 5,529,466 | 6/1996 | Tackett ............... | 417/529 |
| 5,569,025 | 10/1996 | Bendel et al. ............... | 417/434 |
| 5,984,651 | 11/1999 | Beck et al. ............... | 417/503 |
| 6,000,764 | 12/1999 | Dokas ............... | 303/116.4 |

FOREIGN PATENT DOCUMENTS

| | | |
|---|---|---|
| 42 34 750 | 4/1994 | Germany . |
| 44 21 564 | 7/1995 | Germany . |
| 44 07 978 a1 | 9/1995 | Germany . |
| 2 279 135 | 12/1994 | United Kingdom . |
| 95/16859 | 6/1995 | WIPO . |

*Primary Examiner*—Teresa Walberg
*Assistant Examiner*—Jeffrey Pwu
*Attorney, Agent, or Firm*—Ronald E. Greigg; Edwin E. Greigg

[57] ABSTRACT

The invention relates to a piston pump for a slip-controlled hydraulic vehicle brake system. The piston pump has a piston which is driven to execute a stroke motion, and two check valves as an inlet valve and outlet valve for controlling the fluid flow through the piston pump. The outlet valve has a valve closing spring that effects a fast closure of the outlet valve. To enable completely evacuating a positive displacement chamber of the piston pump, the invention includes connecting an evacuation valve, embodied as a springless check valve with a small diameter and with a lightweight valve closing body, hydraulically parallel to the outlet valve.

13 Claims, 1 Drawing Sheet

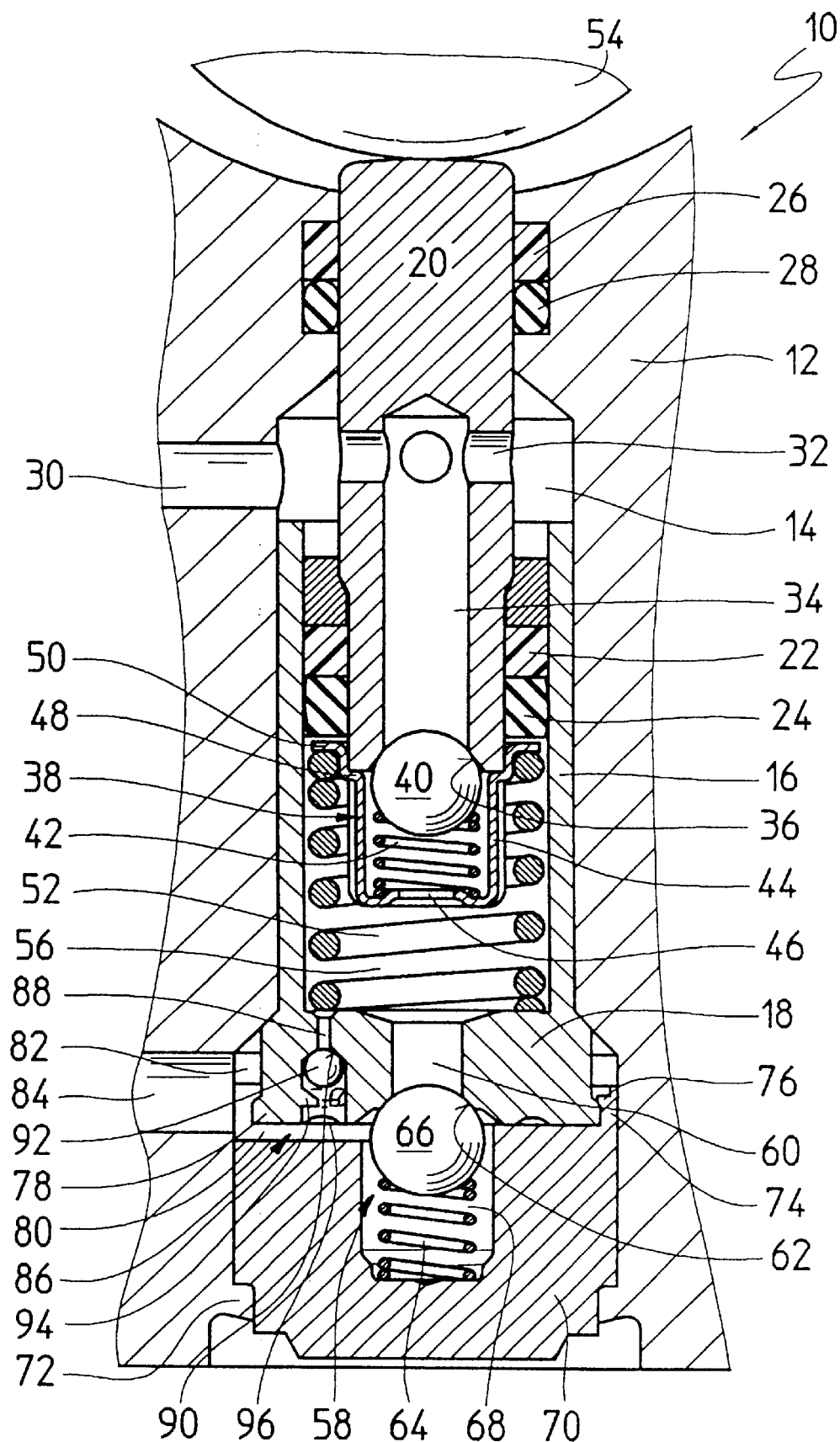

PISTON PUMP

BACKGROUND OF THE INVENTION

The invention relates to a piston pump which is intended for use in a hydraulic vehicle brake system.

Such piston pumps are known per se; see for instance German Patent Disclosure DE 41 07 979 A1. The known piston pump has a piston, which is axially displaceably received in a pump housing. By means of an eccentric element drivable to rotate by an electric motor, the piston can be driven to execute an axially reciprocating stroke motion. To control a fluid flow through it, the known piston pump has two check valves, one of which forms an inlet valve and the other of which forms an outlet valve. The outlet valve closes under spring loading; the inlet valve can close under spring loading but can also be without a closing spring, especially if the piston pump is self-aspirating.

To attain good hydraulic pump efficiency and to reduce noise, it is important that the outlet valve of the piston pump quickly close at the dead center point of the piston at the end of a supply stroke. The supply stroke is the piston motion in a direction that reduces a volume of a positive displacement chamber of the piston pump and as a result positively displaces fuel, aspirated previously during an intake stroke, from the positive displacement chamber. Rapid closure of the outlet valve requires a valve closing spring with high spring force, which in known piston pumps brings about an opening pressure of the outlet valve of over 1 bar, for instance.

Modern vehicle brake systems with slip control are now typically evacuated before being filled with brake fluid. Filling a vehicle brake system without prior evacuation would lead to air inclusions in voids of the vehicle brake system, voids that are formed by magnet valves, hydraulic reservoirs, dampers, and angled fluid bores that form blind bores; the vehicle brake system would be nonoperational. Simple filling of the vehicle brake system with positive displacement of the air contained in it by inflowing brake fluid without prior evacuation is not possible. From the above, it is also clear that all the voids in the vehicle brake system must be evacuated as completely as possible before the vehicle brake system can be allowed to be filled with brake fluid; there must not be any air trapped in voids of the evacuated vehicle brake system. Air remaining in voids can in some cases cause an unpleasantly soft behavior of the brake pedal.

If the known piston pump, on filling of a hydraulic vehicle brake system of which the piston pump is a component, is evacuated from the inlet and/or the outlet side, then a vacuum on the inlet side creates a pressure difference between the positive displacement chamber of the piston pump and the pump inlet, and this difference closes the inlet valve. The positive displacement chamber cannot be evacuated through the inlet valve, regardless of whether the inlet valve is spring-loaded or springless. If the piston pump is evacuated from the outside, a pressure difference of at most 1 bar is operative, which urges the outlet valve in the opening direction. The pressure difference is the result of the pressure, corresponding to the ambient air pressure, of the air trapped in the positive displacement chamber and the vacuum on the outlet side of the piston pump. This pressure difference is not capable of opening the outlet valve counter to the force of the valve closing spring of the outlet valve; that requires an opening pressure of more than one bar. Consequently the air remains trapped in the positive displacement chamber, and the positive displacement chamber of the piston pump is not evacuated. Filling the positive displacement chamber by operating the piston pump with brake fluid may possibly succeed, in which case the trapped air can be positively displaced out of the positive displacement chamber. However, it can also happen that the air trapped in the positive displacement chamber will remain there even in a piston pump operation, in which case the piston pump will not pump.

The problem of air inclusion in the positive displacement chamber of the piston pump is especially severe in evacuation of the vehicle brake system with piston pumps that have a piston restoring spring in the positive displacement chamber. In these piston pumps, an idle space, that is, the residual volume of the positive displacement chamber at the end of the supply stroke, is especially large, since the piston restoring spring requires a residual minimum height of the positive displacement chamber in the axial direction.

OBJECT AND SUMMARY OF THE INVENTION

The piston pump of the invention has an evacuation valve, which communicates with the positive displacement chamber of the piston pump and through which the positive displacement chamber can be evacuated. The piston pump of the invention has the advantage that its positive displacement chamber can be evacuated reliably and completely, which assures complete filling of the piston pump, including its positive displacement chamber, with brake fluid without having to fear air inclusions in the positive displacement chamber.

The outlet valve cannot be dispensed with, because the evacuation valve does not furnish an adequate flow cross section.

The evacuation valve is embodied as a check valve. This has the advantage that the evacuation valve opens automatically upon evacuation of the vehicle brake system.

In a refinement defined herein, the evacuation valve is connected parallel to the outlet valve of the piston pump. This disposition of the evacuation valve has the advantage that it does no harm if the evacuation valve during operation of the piston pump of the invention opens and closes jointly with the outlet valve. Thus, no provisions for keeping the evacuation valve closed during piston pump operation are required.

In a particular feature of the invention, the evacuation valve is springless, so that no pressure difference is required to keep the evacuation valve in the open state; as a result, complete evacuation is accomplished, and premature closure of the evacuation valve by a valve closing spring is avoided.

Accordingly, the evacuation valve has a small cross section and a small valve closing body. The word "small" should be understood here particularly with reference to the outlet valve. A small cross section is sufficient for evacuation, since an increased flow resistance of the evacuation valve is not problematic, because of its small cross section and thereby lengthened duration of evacuation. A small cross section of the evacuation valve makes a small and thus lightweight valve closing body possible and thus enables a short valve closing time of the evacuation valve, even if this valve has no valve closing spring. As noted at the outset for the outlet valve, a short valve closing time is necessary for good hydraulic pump efficiency. Furthermore, a small, lightweight valve closing body reduces noise buildup.

A short, limited valve stroke of the evacuation valve also contributes to a short valve closing time, reduces noise buildup, and is not a hindrance in evacuation.

A limitation of the valve stroke of the evacuation valve is effected by a segmental caulking, that is, by one or more protrusions or the like distributed over its circumference and protruding into a valve bore that receives a valve closing body of the evacuation valve; the dogs or the like between themselves and a valve seat enclose the valve closing body, so that the valve closing body is retained captive in the bore, and a valve stroke, that is, the distance by which the valve closing body can lift away from the valve seat until it strikes the segmental caulking, is limited and short. The segmental caulking as a valve stroke limiter has the advantage that it can be made simply and inexpensively. The valve stroke can be adjusted very precisely. Moreover, no extra component for limiting the valve stroke is needed. The segmental caulking allows an adequate fluid flow.

Accordingly, the evacuation valve discharges into an annular groove, which is mounted for instance in an outer face end, toward a closure plug, of a liner bottom or a face end of the closure plug toward the liner bottom. In the respectively other part, that is, in the closure plug or the liner bottom, there is a radial groove, or in more general terms a groove leading to the circumference, which leads to a pump outlet. The annular groove and the radial groove are each covered by the respectively other part, that is, by the closure plug or the liner bottom, toward a flow conduit. The embodiment of an annular groove that communicates with a radial groove has the advantage that the two components, for instance a liner that has the liner bottom and the closure plug, can be installed in a pump housing at independent angles from one another.

Upon filling of the vehicle brake system after the evacuation, the positive displacement chamber of the piston pump fills with brake fluid on its own, if the opening pressure of the inlet valve is less than the pressure of the inflowing brake fluid. If the opening pressure of the inlet valve is greater, then the positive displacement chamber fills completely with brake fluid the first time the piston pump is actuated. Trapped air is precluded, because the positive displacement chamber was evacuated beforehand.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from braking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The invention will be better understood and further objects and advantages thereof will become more apparent from the ensuing detailed description of a preferred embodiment taken in conjunction with the drawing.

BRIEF DESCRIPTION OF THE DRAWING

The sole drawing shows a piston pump of the invention in axial section.

DESCRIPTION OF THE PREFERRED EMBODIMENT

The piston pump of the invention shown in the drawing and identified overall by reference numeral 10 has a pump housing 12 with a continuous, stepped pump bore 14. The pump housing 12 is part of a hydraulic block of a slip-controlled hydraulic vehicle brake system known per se and not otherwise shown. Besides the piston pump 10, other hydraulic elements of the vehicle brake system, such as magnet valves, hydraulic reservoirs and dampers, are inserted into the hydraulic block, of which the drawing shows only a fraction surrounding the piston pump 10, and are hydraulically connected to one another and to the piston pump 10.

A liner 16 with a liner bottom 18 integral with it is inserted into the pump bore 14. A boltlike piston 20 is received over approximately half its length in the liner 16. An end of the piston 20 located in the liner 16 is guided axially displaceably in the linear 16 by means of a guide ring 22 mounted on the piston 20 and is sealed off in the liner 16 by means of a sealing ring 24 mounted on the guide ring 22, contacting the piston 20.

An end of the piston 20 protruding from the liner 16 is guided axially displaceably in the pump housing 12 by a guide ring 26 and is sealed off in the pump housing 12 by a sealing ring 28. The guide ring 26 and the sealing ring 28 are placed in a common groove in the pump bore 14 in the pump housing 12.

For fluid inflow, an inlet bore 30 is mounted in the pump housing 12, radially to the pump bore 14, and discharges into the pump bore 14. Fluid flowing out of the inlet bore 30 flows through the pump bore 14 into intersecting transverse bores 32, which are disposed approximately in the middle of the piston 20. An axial blind bore 34 is provided in the piston 20, extending in the direction of the liner bottom 18 and discharges at a face end of the piston 20, toward the liner bottom 18, with a conical valve seat 36. The blind bore 34 is intersected near its bottom by the transverse bores 32.

As its inlet valve 38, the piston pump 10 of the invention has a spring-loaded check valve, which is mounted on the face end of the piston 20 toward the liner bottom 18. The inlet valve 38 has a valve ball 40 as its valve closing body, which is pressed against the valve seat 36 on the piston 20 by a helical compression spring acting as a valve closing spring 42. The valve ball 40 and the valve closing spring 42 are received in a cup-shaped valve cage 44, which is mounted on the face end of the piston 20 toward the liner bottom 18. The valve cage 44 is a cup-shaped sheet-metal deep-drawn part, which is provided with a flow opening 46 in its bottom. On an open side, the valve cage 44 is widened with an annular shoulder 48, with which it rests on the face end of the piston 20.

A free edge of the valve cage 44 is deformed toward the outside as a radial flange 50, against which a helical compression spring acting as a piston restoring spring 52 presses; this spring is inserted into the liner 16, surrounding the valve cage 44, and is braced on the liner bottom 18. The piston restoring spring 52 keeps the valve cage 44 with its annular shoulder 48 in contact with the piston 20 and presses the piston 20, via the radial flange 40 and the annular shoulder 48 of the valve cage 44, against a circumference of an eccentric element 54 which is driven to rotate by an electric motor and which is disposed on the face end of the piston 20, remote from the inlet valve 38, in the pump housing 12 and serves to drive the piston 20 in a manner known per se to execute an axially reciprocating stroke motion. The piston restoring spring 52 thus has the dual function of keeping the piston 20 in contact with the circumference of the eccentric element 54 that drives it and of keeping the inlet valve 38 on the face end of the piston 20 located in the liner 16. The piston restoring spring 52 is embodied substantially more strongly than the valve closing spring 42, so that the piston restoring spring 52 securely keeps the valve cage 44, with its annular shoulder 48, on the piston 20 counter to the force of the valve closing spring 42.

The valve closing spring 42 of the inlet valve 38 is designed for an opening pressure of the inlet valve 38, that is, a pressure difference between the blind bore 34 in the piston 20 and a positive displacement chamber 56 of the piston pump 10, that lifts the valve ball 40 from the valve seat 36 counter to the force of the valve closing spring 42, of approximately 1 bar or more, for instance. When a self-aspirating pump is used, the valve closing spring 42 of the inlet valve 38 can also be designed for an opening pressure of about 0.3 bar or less, or the valve closing spring 42 of the inlet valve 38 can be dispensed with entirely. The positive displacement chamber 56 of the piston pump 10 is the volume, enclosed inside the liner 16 between the liner bottom 18 and the piston 20 by the sealing ring 24, that alternatingly increases and decreases in size in the reciprocating motion of the piston 20 and thus for pumping fluid aspirates fluid into the positive displacement chamber 56 and then positively displaces it.

As its outlet valve 58, the piston pump 10 of the invention also has a spring-loaded check valve, which is disposed on an outside of the liner bottom 18, remote from the piston 20: The liner bottom 18 is provided with a center hole 60, which discharges on the outside of the liner bottom 18 in a conical valve seat 62. A helical compression spring acting as a valve closing spring 64 presses a valve ball 66, as a valve closing body, against the valve seat 62. The valve closing spring 64 and the valve ball 66 are received in a coaxial blind bore 68 in a closure plug 70 that is mounted on the outside of the liner bottom 18. The closure plug 70 is a cylindrical part which is inserted into the pump bore 14 on the side of the liner bottom 18 and is mounted in the pump housing, closing the pump bore 14 in pressure-tight fashion, by a caulking 72 of the pump housing 12. The closure plug 70 fixes the liner 16 in the pump housing 12. The closure plug 70 has a low, hollow-cylindrical edge 74 with which it embraces the liner bottom 18. By means of a crimp 76 of the edge 74, the hollow-cylindrical edge 74 engages an encompassing collar 78 of the liner bottom 18, which protrudes to the outside past a circumference of the liner bottom 18, from behind, thus joining the closure plug 70 to the liner 16.

A fluid outflow in the piston pump 10 of the invention for fluid positively displaced from the positive displacement chamber 56 is effected through a radial groove 80 in the closure plug 70 via an annular conduit 82 in the pump housing 12 that surrounds the liner bottom 18 into an outlet bore 84, which is provided in the pump housing 12 radially to the pump bore 14.

The valve closing spring 64 of the outlet valve 58 is designed for an opening pressure of the outlet valve 58 of over 1 bar. The opening pressure of the outlet valve 58 is the pressure difference between the positive displacement chamber 56 and a pressure in the blind bore 68 in the closure plug 70 that lifts the valve ball 66 away from the valve slot 62 counter to the force of the valve closing spring 64. The pressure in the blind bore 68 is equal to the pressure in the outlet bore 84, aside from possible flow resistances.

To evacuate the positive displacement chamber 56 before the vehicle brake system, not shown, is filled, the piston pump 10 of the invention in the exemplary embodiment shown and described being a component of this vehicle brake system, the piston pump 10 of the invention has an evacuation valve 86 in the form of a springless check valve: In a side region of the liner bottom 18, a through bore 88 is provided, which widens with a conical annular shoulder in the direction toward the outside of the liner bottom 18. The annular shoulder forms a conical valve seat 90 of the evacuation valve 86. In the expanded portion of the through bore 88, a valve ball 92 is received that forms a valve closing body of the evacuation valve 86. The valve ball 92 is held on a side of the valve ball 92 remote from the valve seat 90, in the widened part of the through bore 88, by three segmental caulkings 94 distributed over the circumference of the through bore 88. The segmental caulkings 94 hold the valve ball 92 between themselves and the valve seat 90; they form a valve stroke limiter for the evacuation valve 86, and limit a valve stroke by the length of which the valve ball 92 can be lifted away from the valve seat 90 to a short distance. The through bore 88 discharges into an encompassing annular groove 96, which is provided in the outside of the liner bottom 18 and has a curved groove cross section, and which assures that the through bore 88 that receives the evacuation valve 86 communicates with the radial groove 80, leading to the outlet bore 84, in the closure plug 70 regardless of an angular position of the liner 16 relative to the closure plug 70. Thus the evacuation valve 86 is connected hydraulically parallel to the outlet valve 58.

The through bore 88 has a short diameter, in comparison with the diameter of the center hole, leading to the outlet valve 58, in the liner bottom 18. Because of the small diameter, the valve ball 92 is small and lightweight, so that the evacuation valve 86 closes rapidly even without a valve closing spring. To assure fast closure of the evacuation valve 86, its opening stroke is also limited to a short distance by the segmental caulkings 94. Because of the small diameter of the through bore 88, the flow cross section of the evacuation valve 86 is small and thus a flow resistance through it is high. The short valve stroke of the evacuation valve 86 additionally reduces the flow cross section and thus increases the flow resistance. This high flow resistance of the evacuation valve 86 does lengthen the evacuation time of the outlet valve 56 when a vacuum is applied to the inlet bore 30 and outlet bore 84 of the piston pump 10, but this is not a problem. The evacuation valve 86, because of its high flow resistance, is unsuitable as an outlet valve, because it would considerably lessen the hydraulic efficiency of the piston pump 10 and would require a high drive capacity despite an only low supply quantity. The outlet valve 58, with its multiple times greater flow cross section and consequently its flow resistance reduced to a fraction cannot be replaced by the evacuation valve 86. The valve closing spring 64 of the outlet valve 58 effects rapid closure of the outlet valve 58 by its valve ball 66, which is large and heavy in comparison to the evacuation valve 86, and with an opening stroke that is longer by multiple times. Because of the requisite valve closing spring 64, which brings about an opening pressure of the outlet valve 58 of more than 1 bar, the outlet valve 58 is unsuited to evacuating the positive displacement chamber 56 of the piston pump 10.

The foregoing relates to a preferred exemplary embodiment of the invention, it being understood that other variants and embodiments thereof are possible within the spirit and scope of the invention, the latter being defined by the appended claims.

I claim:

1. A piston pump, comprising a pump housing, a piston which is driven to execute a reciprocating stroke motion and is received axially displaceably in said pump housing, a positive displacement chamber, whose volume alternately increases upon the piston stroke motion, whereupon fluid is aspirated by the piston pump, and decreases, whereupon fluid is positively displaced from the positive displacement chamber, a check valve as an inlet valve, and a spring-loaded check valve as an outlet valve, the piston pump (10) includes a springless evacuation valve (86), which communicates with the positive displacement chamber (56).

2. The piston pump according to claim 1, in which the evacuation valve (86) is a check valve through which the fluid flow can flow in the direction out of the positive displacement chamber (56).

3. The piston pump according to claim 2, in which the evacuation valve (86) has a limited valve stroke.

4. The piston pump according to claim 1, in which the evacuation valve (86) is connected hydraulically parallel to the outlet valve (58).

5. The piston pump according to claim 4, in which the evacuation valve (86) has a limited valve stroke.

6. The piston pump according to claim 5, in which a limitation of the valve stroke of the evacuation valve (86) is established by a segmental caulking (94).

7. The piston pump according to claim 1, in which the evacuation valve (86) has a small cross section and a valve closing body (92).

8. The piston pump according to claim 7, in which the evacuation valve (86) has a limited valve stroke.

9. The piston pump according to claim 8, in which a limitation of the valve stroke of the evacuation valve (86) is established by a segmental caulking (94).

10. The piston pump according to claim 1, in which the evacuation valve (86) has a limited valve stroke.

11. The piston pump according to claim 10, in which a limitation of the valve stroke of the evacuation valve (86) is established by a segmental caulking (94).

12. A piston pump, comprising a pump housing, a piston which is driven to execute a reciprocating stroke motion and is received axially displaceably in said pump housing, a positive displacement chamber, whose volume alternately increases upon the piston stroke motion, whereupon fluid is aspirated by the piston pump, and decreases, whereupon fluid is positively displaced from the positive displacement chamber, a check valve as an inlet valve, and a spring-loaded check valve as an outlet valve, the piston pump (10) includes an evacuation valve (86), which communicates with the positive displacement chamber (56), said evacuation valve (86) has a limited valve stroke, said limited valve stroke is established by a segmented caulking (94); and the evacuation valve (86) is a check valve through which the fluid flow flows in a direction out of the positive displacement chamber (56).

13. A piston pump, comprising a pump housing, a piston which is driven to execute a reciprocating stroke motion and is received axially displaceably in said pump housing, a positive displacement chamber, whose volume alternately increases upon the piston stroke motion, whereupon fluid is aspirated by the piston pump, and decreases, whereupon fluid is positively displaced from the positive displacement chamber, a check valve as an inlet valve, and a spring-loaded check valve as an outlet valve, the piston pump (10) includes an evacuation valve (86), which communicates with the positive displacement chamber (56), and the evacuation valve (86) discharges into an annular groove (96), which communicates with a radial groove (80) that leads to a pump outlet (82, 84).

* * * * *